J. BOSS.
Fruit-Carrier.
No. 206,295. Patented July 23, 1878.
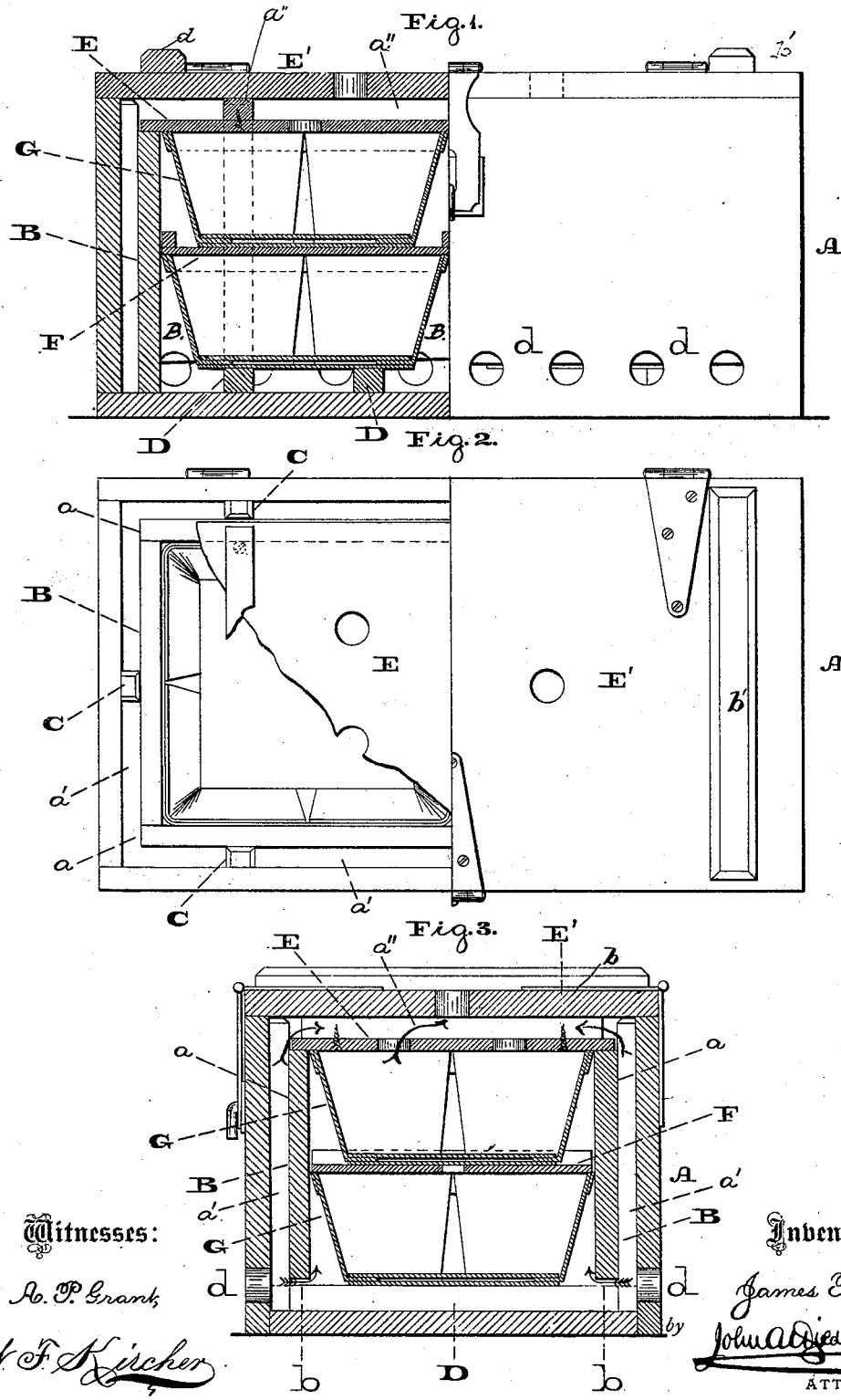

UNITED STATES PATENT OFFICE.

JAMES BOSS, OF BERLIN, MARYLAND.

IMPROVEMENT IN FRUIT-CARRIERS.

Specification forming part of Letters Patent No. 206,295, dated July 23, 1878; application filed February 21, 1878.

*To all whom it may concern:*

Be it known that I, JAMES BOSS, of Berlin, in the county of Worcester and State of Maryland, have invented a new and useful Improvement in Fruit and Berry Carriers, which improvement is fully set forth in the following specification and accompanying drawings, in which—

Figure 1 is a front view, partly sectional, of the carrier embodying my invention. Fig. 2 is a top view thereof, partly broken away. Fig. 3 is a transverse vertical section.

Similar letters of reference indicate corresponding parts in the several figures.

My invention consists of a fruit and berry carrier so constructed that the fruit and berries may be transported or shipped without being shifted, upset, crushed, or pressed, and they will retain their natural flavor, color, size, and appearance.

Referring to the drawings, A represents a box, within which is secured a chamber, B, which is separated from the inner walls of the space by vertically-extending battens C, which leave air-spaces between the sides of the chamber and box.

D represents horizontally-extending battens secured to the bottom of the box A, and the side pieces, $a$, of the chamber do not extend down to the battens D, whereby there are left air-spaces $b$ between said pieces $a$ and the battens D. In the front and rear pieces of the box A, at or near the bottom thereof, there are openings or slots $d$, which form a lower communication between the atmosphere and box, and consequently between the atmosphere and the chamber B.

Secured to the lid E' of the box is a cover, E, for the chamber B, and said lid and cover are perforated or slotted, so that there is an upper communication between the box and chamber and the atmosphere.

F represents a slotted or perforated partition, which is to be placed between the tiers of baskets containing the fruit or berries.

The operation is as follows: A row or tier of baskets of berries or fruit is placed within the chamber B, on the battens D, and a partition, F, rested on top of said row. Then another row or tier is laid, and as many more as desired, with intervening partitions, after which the lid E' is shut, (thus closing the chamber B,) and is properly fastened or locked.

The air enters the openings $d$, and it is directed into the air-spaces $a'$, between the chamber B and box A, and the space $a''$ over the cover E, from whence it reaches the atmosphere through the perforations or openings in the lid of the box, the current of air thus created in the spaces serving to cool the chamber B. Another volume of air passes through the spaces or channels $b$, adjacent to the openings $d$, into said chamber, and circulates therein, passing through the fruit or berries of one row or tier of baskets, then through the openings or spaces of the partition F, and again through the fruit or berries of the next row or tier of baskets, and finally through the perforations of the cover E and lid E' to the atmosphere.

It will be noticed that, owing to the baskets in the chamber B, the passage of air in the latter is somewhat retarded or broken; consequently the circulation of air in the chamber is easy and gentle, whereby, while the fruit or berries are not subjected to a violent circulation, injurious in its nature, they are properly cooled, and the vapors and matters rising from the fruit or berries duly passed out.

Again, the fruit or berries are not exposed to light, and this, with the advantageous effects of the circulating air within the chamber, and the cold air surrounding the same, causes the fruit and berries to remain dry and be well preserved, and to retain their color, size, appearance, and flavor.

Moreover, it will be seen that the berries and fruit are confined in the baskets by the partitions, and the baskets and partitions by the cover E and the lid E', whereby the box may be shipped and handled without causing the fruit or berries to upset or shift, so that crushing or pressing of the same or other objectionable results thereto are prevented, and the contents of the box will reach their destination in good order. If desired, the partition F may be provided with transverse and longitudinally-extending cleats, which will rest on the top of the baskets, so as to provide covers therefor when said baskets are "heaped."

For short carriage of fruit and vegetables the inside chamber, B, may be employed without the box A. In this case a bottom will be secured to the said chamber B, so as to leave the air-spaces $b\ b$, and the baskets will be placed on said bottom, and arranged with the partitions and top cover, so as to confine the baskets and their contents. The chamber B may be made of wood, metal, or other proper material.

G represents boxes or baskets, which are increased in width and decreased in depth, whereby the berries or fruit may be carried level in said boxes or baskets without heaping, as is customary in other boxes and crates; but other styles of boxes may be employed within the chamber B without departing from my invention; but the shallow boxes are desirable, because the weight of fruit or berries therein is decreased, and liability of crushing the same is prevented.

The exterior of the top of the box will be provided with cleats $b'$, for preventing closing of the perforations of said lid when boxes are placed one above the other.

Having thus described my invention, what I claim as new, and desire to secure by Letters Patent, is—

1. The box A, with vertically-extending battens C on its sides, horizontally-extending battens D on its bottom, and openings $d$ in its sides near the bottom, in combination with the chamber B, resting on the bottom of the box, and having its side pieces, $a$, suspended over the bottom battens D, so as to leave thereunder the spaces or channels $b$, which are adjacent to the side openings, $d$, the latter constituting a side inlet for air common to both box A and chamber B, substantially as and for the purpose set forth.

2. The box A and chamber B, with side air-spaces, $a'$, and bottom air-spaces, $b$, said box having a perforated lid, $E'$, and the chamber B a perforated cover, E, with an intervening air-space, $a''$, between said lid and cover, substantially as and for the purpose set forth.

3. The box A, with bottom openings $d$, the perforated lid $E'$, the inside chamber, B, with surrounding air-spaces $a'$, and bottom spaces or channels, $b$, the perforated cover E, and the slatted covering partition or partitions F, combined and operating substantially as and for the purpose set forth.

JAMES BOSS.

Witnesses:
    JOHN A. WIEDERSHEIM,
    A. P. GRANT.